UNITED STATES PATENT OFFICE.

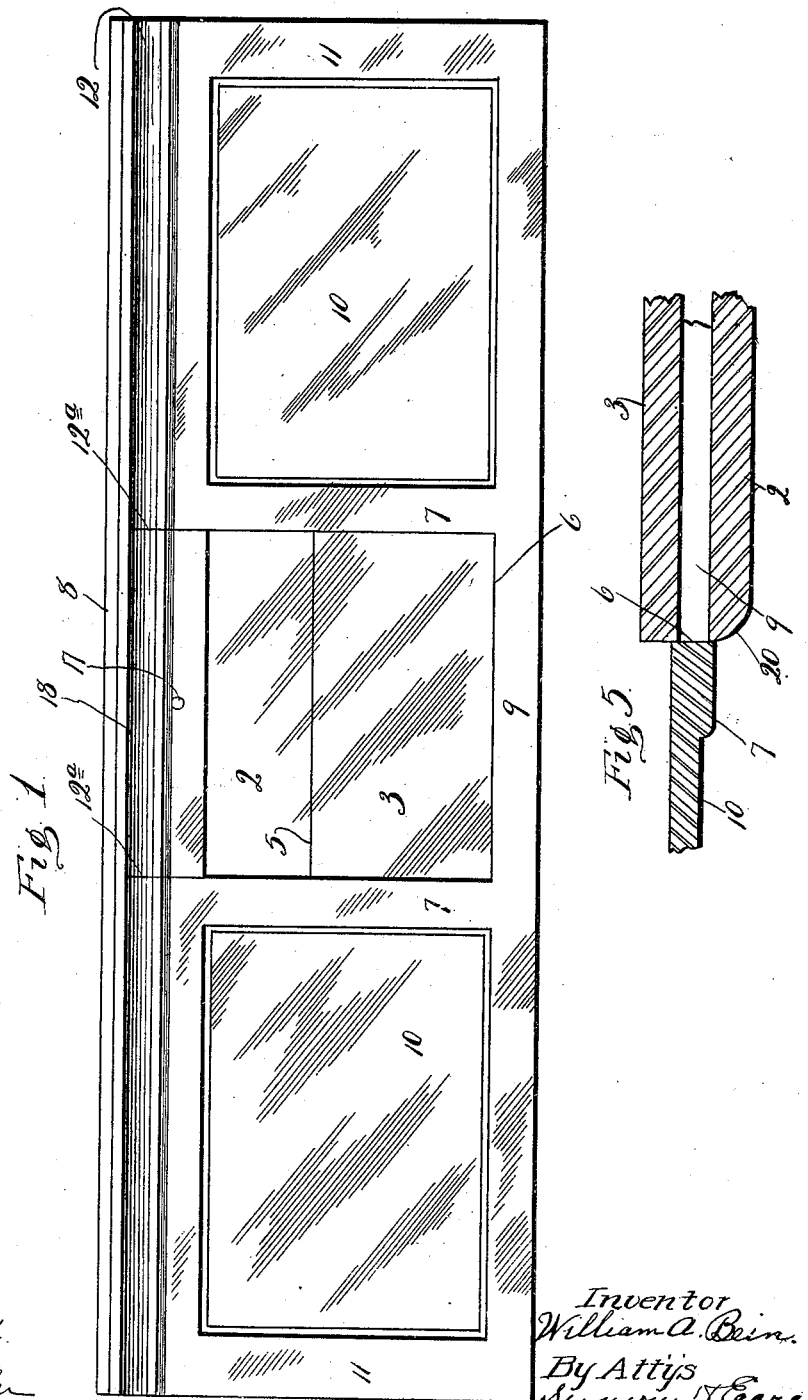

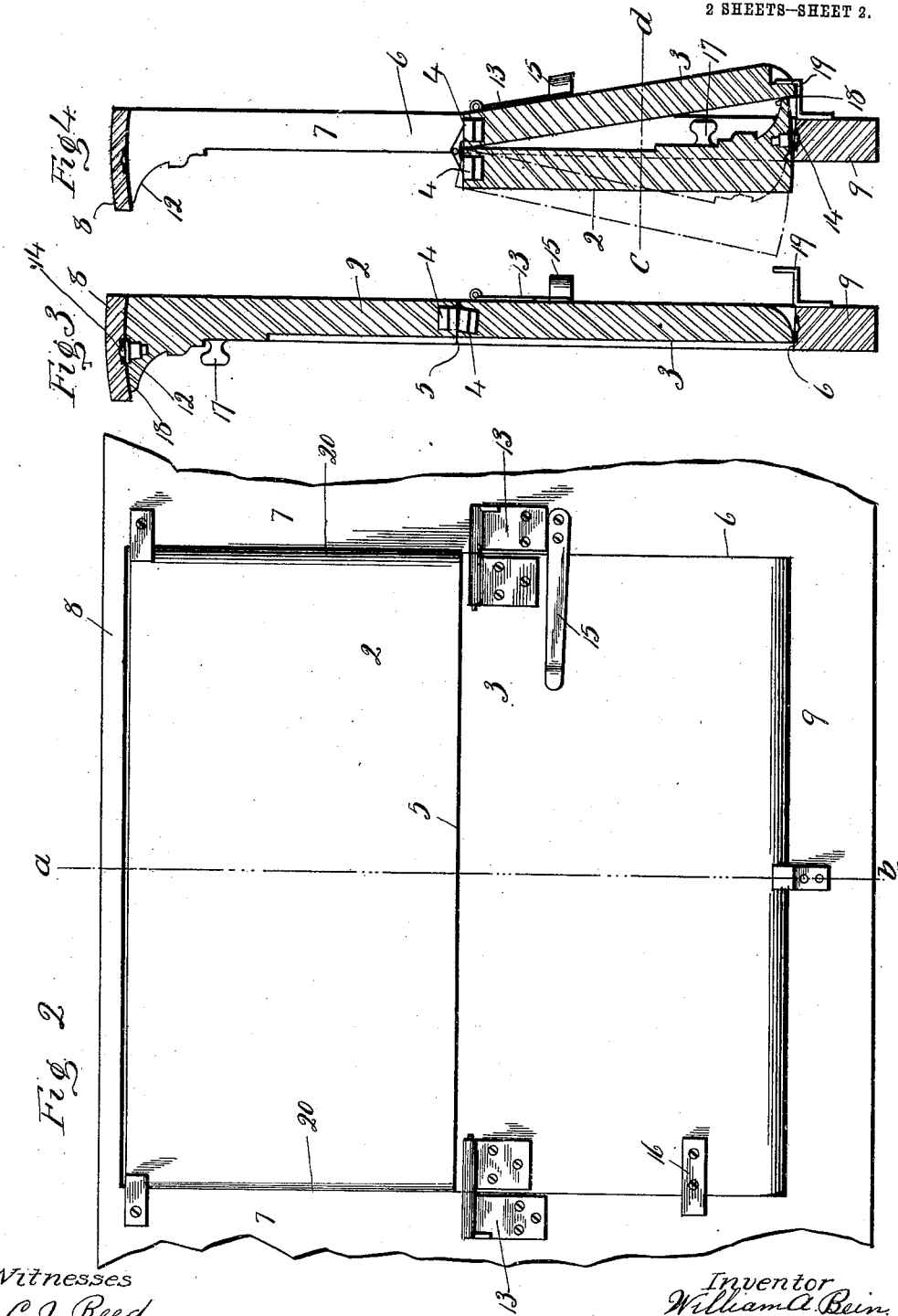

WILLIAM A. BEIN, OF NEW HAVEN, CONNECTICUT, ASSIGNOR TO B. SHONINGER CO., OF NEW HAVEN, CONNECTICUT, A CORPORATION.

CENTER PANEL FOR UPRIGHT PLAYER-PIANOS.

991,822.  Specification of Letters Patent.  Patented May 9, 1911.

Application filed October 10, 1910. Serial No. 586,265.

*To all whom it may concern:*

Be it known that I, WILLIAM A. BEIN, a citizen of the United States, residing at New Haven, in the county of New Haven and State of Connecticut, have invented a new and useful Improvement in Center Panels for Upright Player-Pianos; and I do hereby declare the following, when taken in connection with the accompanying drawings and the letters of reference marked thereon, to be a full, clear, and exact description of the same, and which said drawings constitute part of this specification, and represent, in—

Figure 1 a view in front elevation of the panel-frame forming the upper portion of the front of an upright player-piano case. Fig. 2 a broken view in rear elevation on a larger scale, showing the middle portion of the said panel-frame. Fig. 3 a view in vertical section on the line *a—b* of Fig. 2, the two leaves forming the center panel being shown in their normal or closed positions. Fig. 4 a corresponding view showing the upper leaf in its open position and the lower leaf in its clearance position. Fig. 5 a broken view in horizontal section on the line *c—d* of Fig. 4, showing the upper and lower leaves in their open positions.

My invention relates to an improvement in the center panels for the cases of upright player-pianos, the object being to produce a simple, compact and convenient center-panel constructed with particular reference to presenting a neat and attractive appearance when open as well as when closed.

With these ends in view my invention consists in certain details of construction as will be hereinafter described and pointed out in the claims.

In carrying out my invention, I employ a sectional vertical center-panel consisting of an upper leaf 2 and a lower leaf 3 each of the same or substantially the same width, and hinged together by concealed hinges 4 so that when both leaves are in their normal or closed positions, the fact that the center-panel is made in two pieces instead of in one piece is only indicated by a horizontal line 5. The said leaves 2 and 3 are normally located in the vertical plane in a rectangular opening 6 formed between the two intermediate uprights 7 and the top and bottom rails 8 and 9 of the panel-frame forming the front of the upper portion of the piano-case, the said frame also containing end-panels 10, end-uprights 11 and an over-hanging molding 12 which extends entirely across the length of the panel-frame, which is located directly beneath the horizontally arranged upper rail 8 and which is continued across the upper end of the upper leaf 2 for which purpose it is made in three sections so as to break joints at the edges of the said leaf 2 as at 12ª. The said leaves 2 and 3 hinged together as described, are suspended, as it were, in the opening 6 aforesaid, by means of hinges 13 the leaves of which are respectively secured to the back of the lower leaf 3, and to the inner faces of the intermediate uprights 7 of the panel-frame as clearly shown in Fig. 2, the pintles of these hinges being located very close to the line 5 on which the adjacent edges of the leaves 2 and 3 come together and therefore at about the middle of the vertical height of the said opening 6. The upper leaf 2 is held in its normal or closed position, by means of a yielding catch-button 14 mounted in the center of its upper edge, while the lower leaf 3 is held in its normal or closed position by means of a spring 15 engaging with its inner face, secured to one of the two intermediate uprights 7 and exerting a constant effort to swing it from rear to front. A stop 16 carried by the lower leaf 3 and engaging with the adjacent intermediate upright 7 prevents the said spring 15 from moving the lower edge of the lower leaf 3 forward beyond the vertical plane. Normally the leaves 2 and 3 stand as shown in Figs. 1, 2 and 3, the outer faces of the two leaves being in the vertical plane and that portion of the molding 12 applied to the outer face of the upper leaf 2 being in line with the remaining portions of the same molding.

To open the two-part center-panel for access to the player-mechanism, which is not shown, the upper leaf 2 is furnished with a button 17 by means of which the leaf is pulled forward against the friction of the catch-button 14. When the said upper leaf 2 is swung outward and downward the edge 18 of its molding 12, strikes the lower edge of the front face of the lower leaf 3 which is then swung inward as shown by Fig. 4 against the tension of the spring 15, into its clearance position in which it is stopped by a positioning bracket 19 attached to the inner face of the lower rail 9 of the panel-frame. By thus providing for the swinging of the lower leaf 3 of the two-part panel inward into a clearance position as shown in Fig. 4, I am enabled to swing the upper leaf into a vertical position in which its forward projection is of course lessened and in which it therefore is out of the way and presents a far better appearance than if it were left in the inclined position shown by broken lines by Fig. 4, in which it would be left if I did not make provision, as described, for the swinging of the lower leaf of the panel inward into what I call its clearance position. Now by beveling the inner face of the upper leaf 2 at its ends as at 20, (Figs. 2 and 5) these bevels, when the said leaf is in its open position, do away with the objectionable thick edge and form an attractive finish for the center panel of the panel-frame. The upper leaf is held in its open position by the catch-button 14 as also shown in Fig. 4. To restore the upper leaf to its closed position, its projecting lower edge is engaged and the leaf lifted sufficiently to nullify the action of the catch-button 14, whereupon the leaf may readily be drawn forward and swung back into its closed position at which time the spring 15 acts to swing the lower leaf 3 forward from its clearance to its normal position in which it is stopped by the finger 16.

By my invention, I am enabled to provide the upper edge of the upper leaf 2 of the panel with its appropriate part of the molding 12 and yet when the leaf is open, retire the molding, as it were, into the case so that it does not compel an inclined position for the leaf when the same is in its open position.

I claim:—

1. In an upright player-piano, the combination with a panel-frame having a vertical panel-opening, of a two-part panel consisting of an upper and a lower leaf each of the same or substantially the same width, hinges uniting the said leaves, means for hinging the said lower leaf to the back of the said panel-frame at about the middle of the vertical height of the said panel-opening, and means for normally supporting the leaves in the vertical plane, the lower leaf being pushed inward into its inclined clearance position by the upper leaf when the same is swung into its open position.

2. In an upright player piano, the combination with a panel-frame having a vertical central opening, of a vertical center-panel consisting of an upper leaf and a lower leaf, each of the same or substantially the same width, and the upper leaf being provided along its upper edge with a forward projection, hinges uniting the said leaves, means for hinging the lower leaf to the back of the said panel at about the middle of the vertical height of the said opening therein, means for normally holding the upper leaf in its closed position, and a spring for normally holding the lower leaf in its normal position but permitting it to swing rearward into an inclined clearance position into which it is forced by the forward projection of the upper leaf when the same is swung forward, downward and rearward into its open position to open the upper portion of the panel-opening.

3. In an upright player piano, the combination with a panel-frame having a vertical central opening, of a vertically arranged center-panel consisting of an upper and a lower leaf, each of the same or substantially the same width, hinges uniting the said leaves, means for hinging the lower leaf to the back of the panel-frame at or about the middle of the vertical height of the said opening therein, means for holding the said upper leaf in its open and closed positions, means for holding the lower leaf in its normal position but permitting it to be swung rearward into its inclined clearance position by the said upper leaf when the same is swung forward, downward and rearward into its open position; and stops for limiting the swinging movement of the said lower leaf.

4. In an upright player-piano, the combination with a panel-frame having a vertical panel-opening, of a two-part panel consisting of an upper and a lower leaf each of the same or substantially the same width, hinges uniting the said leaves, means for hinging the lower leaf to the back of the said frame at about the middle of the vertical height of the said panel-opening, a sectional molding extending across the top of the said panel-frame and across the upper edge of the outer face of the said upper leaf, and means for normally holding the said leaves in the vertical plane, the section of molding carried by the upper leaf being entered into the bottom of the said panel-opening when the upper leaf is swung into its open position at which time its said section of the molding pushes the lower leaf inward into its inclined clearance position.

In testimony whereof, I have signed this specification in the presence of two subscribing witnesses.

WM. A. BEIN.

Witnesses:
CLIFFORD J. REED,
FREDERIC C. EARLE.

Copies of this patent may be obtained for five cents each, by addressing the "Commissioner of Patents, Washington, D. C."